(12) United States Patent
Manaka (10) Patent No.: US 11,994,214 B2
(45) Date of Patent: May 28, 2024

(54) SEALING DEVICE

(71) Applicant: NOK CORPORATION, Tokyo (JP)

(72) Inventor: Yuto Manaka, Fukushima (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 17/619,430

(22) PCT Filed: Aug. 26, 2020

(86) PCT No.: PCT/JP2020/032171
§ 371 (c)(1),
(2) Date: Dec. 15, 2021

(87) PCT Pub. No.: WO2021/039839
PCT Pub. Date: Mar. 4, 2021

(65) Prior Publication Data
US 2022/0243822 A1 Aug. 4, 2022

(30) Foreign Application Priority Data

Aug. 30, 2019 (JP) ................................. 2019-159003

(51) Int. Cl.
*F16J 15/3204* (2016.01)
(52) U.S. Cl.
CPC ................................ *F16J 15/3204* (2013.01)
(58) Field of Classification Search
CPC .... F16J 15/00; F16J 15/16; F16J 15/50; F16J 15/52; F16J 15/32; F16J 15/3208; F16J 15/3212; F16J 15/3204

(Continued)

(56) References Cited

U.S. PATENT DOCUMENTS 9,927,031 B2 *   3/2018 Omoto ................ F16F 15/1442
2022/0243822 A1 * 8/2022 Manaka ............... F16J 15/3276

FOREIGN PATENT DOCUMENTS

CN    201672061 U    12/2010
CN    208057942 U    11/2018
(Continued)

OTHER PUBLICATIONS

International Preliminary Report on Patentability for corresponding International Application No. PCT/JP2020/032171 dated Mar. 1, 2022, with English translation (10 Pages).
Written Opinion of the International Searching Authority for corresponding International Application No. PCT/JP2020/032171 dated Oct. 6, 2020, with English translation (8 Pages).
International Search Report (in English and Japanese) issued in PCT/JP2020/032171, dated Oct. 6, 2020; ISA/JP (5 pages).

(Continued)

*Primary Examiner* — Nathan Cumar
(74) *Attorney, Agent, or Firm* — Harness, Dickey & Pierce, P.L.C.

(57) ABSTRACT

To suppress a decrease in the tightening force of a seal lip with respect to a shaft regardless of the rigidity of a protrusion. An elastic portion of a sealing device includes an annular seal lip, and the seal lip includes a lip tip end portion and an interior side dust lip. The lip tip end portion is an annular portion protruding to the inner periphery side and formed to contact an output shaft of a reduction gear in the usage state. The interior side dust lip is an annular protrusion provided closer to a sealing target side than is the lip tip end portion. The interior side dust lip protrudes toward the axis x and is formed to contact the output shaft in the usage state. The seal lip also includes a dent portion, which forms a dent, on the outer periphery side of a base of the interior side dust lip.

5 Claims, 5 Drawing Sheets (58) Field of Classification Search
USPC .......................................................... 277/549
See application file for complete search history.

(56) References Cited

FOREIGN PATENT DOCUMENTS

| CN | 113892004 | A | | 1/2022 | |
|---|---|---|---|---|---|
| EP | 1239197 | A1 | | 9/2002 | |
| EP | 3988821 | A1 | * | 4/2022 | ........... F16J 15/3232 |
| EP | 3988821 | A1 | | 4/2022 | |
| JP | H05-030638 | U | | 4/1993 | |
| JP | H11-173239 | A | | 6/1999 | |
| JP | 2000-225649 | A | | 8/2000 | |
| JP | 2004-301194 | A | | 10/2004 | |
| JP | 2012-154409 | A | | 8/2012 | |
| JP | 2016-151337 | A | | 8/2016 | |

OTHER PUBLICATIONS

Notice of Reasons for Refusal for corresponding Japanese Application No. 2021-542961 dated Feb. 21, 2023, with English translation (8 Pages).

Extended European Search Report for corresponding Application No. 20859394.7 dated Sep. 15, 2023 (12 Pages).

Firist Office Action issued in corresponding Chinese Patent Application No. 202080042220.4 dated Oct. 8, 2023, with English translation (14 Pages).

Gao Jingru, "Sealing Device", http://www.cqvip.com, with English translation, 2001 (2 Pages).

Decision of Refusal issued in corresponding Chinese Patent Application No. 2020800422204 dated Mar. 20, 2024, with English translation (7 Pages).

* cited by examiner

SEALING DEVICE

CROSS REFERENCE TO RELATED APPLICATIONS

This is the National Stage of International Application No. PCT/JP2020/032171, filed Aug. 26, 2020, which claims the benefit of Japanese Patent Application No. 2019-159003 filed Aug. 30, 2019, and the disclosures of which are hereby incorporated by reference in their entirety.

BACKGROUND

Technical Field

The present disclosure relates to a sealing device, and in particular, to a sealing device used for a shaft that undergoes reciprocating motion.

Related Art

Conventionally, a sealing device has been used for sealing a gap between a shaft that undergoes reciprocating motion, such as rotation reciprocating motion or linear reciprocating motion, and a through-hole through which the shaft is inserted. Among sealing devices is a sealing device that prevents leakage of a lubricant as a sealing target within an apparatus to the outside and also prevents intrusion of a liquid and foreign matter, such as dust, into the apparatus from the atmosphere side. For example, a reduction gear of a robot includes a number of internal transmission members, such as gears, that contact each other. Due to contact between such transmission members, the transmission members may wear, which in turn may generate foreign matter such as wear debris. When a sealing device is used for such a reduction gear of a robot, for example, there may be a case where foreign matter, such as wear debris, of the transmission members is trapped between a seal lip and a shaft. When the foreign matter is caught by the seal lip, the seal lip may become damaged, and thus, the sealing function of the seal lip may be adversely affected. Therefore, there has been conventionally proposed a sealing device in which the interior side of a seal lip is provided with an annular protrusion protruding toward a shaft so that the protrusion is caused to contact the shaft and thus prevents foreign matter in an internal space from approaching the seal lip (for example, see Japanese Utility Model Laid-Open No. H5-30638).

Although the aforementioned sealing device, which has an annular protrusion on the interior side of a seal lip, can suppress the approach of foreign matter in an internal space to the seal lip, when the length of the protrusion along its extension direction is reduced based on the structure of a target to which the sealing device is attached, the rigidity of the protrusion is increased. With the increased rigidity of the protrusion, a force of lifting the seal lip from the shaft may increase due to the rigidity of the protrusion, with the result that the tightening force of the seal lip with respect to the shaft may decrease.

Therefore, for such a conventional sealing device, a configuration has been demanded in which a decrease in the tightening force of the seal lip with respect to the shaft can be suppressed regardless of the rigidity of the protrusion.

The present disclosure has been made in view of the foregoing problems, and it is an object of the present disclosure to provide a sealing device in which a decrease in the tightening force of a seal lip with respect to a shaft can be suppressed regardless of the rigidity of a protrusion.

SUMMARY

To achieve the aforementioned object, a sealing device according to the present disclosure is a sealing device for sealing a gap between a through-hole and a shaft inserted through the through-hole, characterized by including an annular reinforcement ring around an axis; and an elastic portion around the axis, the elastic portion being formed of an annular elastic material and being attached to the reinforcement ring, in which the elastic portion includes an annular seal lip, the seal lip includes an annular lip tip end portion protruding to an inner periphery side and formed to contact the shaft, and an interior side dust lip that is an annular protrusion provided closer to a sealing target side than is the lip tip end portion in a direction of the axis, the interior side dust lip protrudes toward the axis and is formed to contact the shaft, and the seal lip includes a dent portion on an outer periphery side of a base of the interior side dust lip, the dent portion forming a dent.

In the sealing device according to an aspect of the present disclosure, the dent portion extends in an intermittent annular shape or in an endless annular shape around the axis.

In the sealing device according to an aspect of the present disclosure, the dent portion forms, on an interior side end surface that is a surface of the seal lip facing the sealing target side, a portion that dents to a side opposite to the sealing target side.

In the sealing device according to an aspect of the present disclosure, the dent portion is continuous with the interior side dust lip.

In the sealing device according to an aspect of the present disclosure, an aspect ratio of the interior side dust lip is less than 2, the aspect ratio being a ratio of a length of the interior side dust lip along an extension direction of the interior side dust lip to a width of the interior side dust lip in a direction orthogonal to the extension direction.

Effects of Disclosure

With a sealing device according to the present disclosure, it is possible to suppress a decrease in the tightening force of a seal lip with respect to a shaft regardless of the rigidity of a protrusion.

DETAILED DESCRIPTION

Hereinafter, an embodiment of the present disclosure will be described with reference to the drawings.

Figure 1:
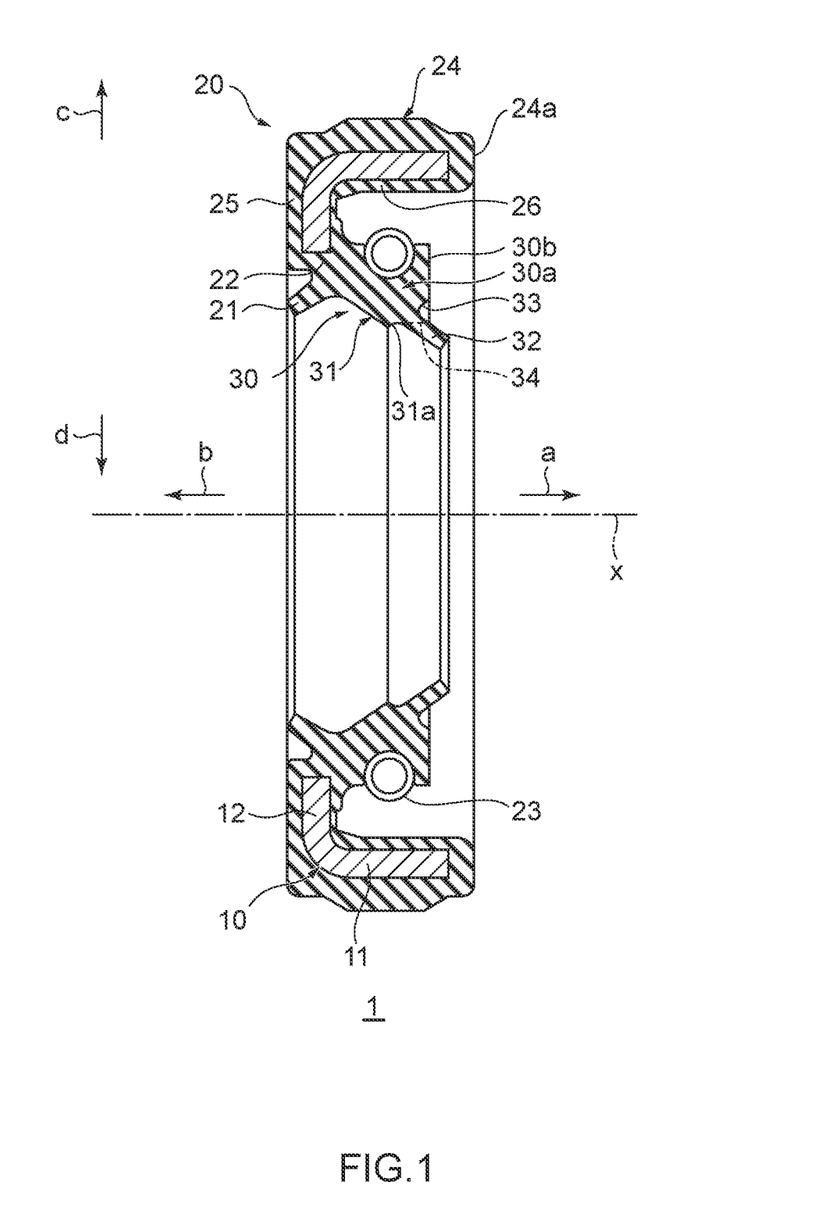
FIG. 1 is across-sectional view of a sealing device according to an embodiment of the present disclosure along an axis, for illustrating the schematic configuration of the sealing device.

FIG. 1 is a cross-sectional view along an axis x for illustrating the schematic configuration of a sealing device 1 according to an embodiment of the present disclosure. The sealing device 1 according to an embodiment of the present disclosure is used to seal a gap between a through-hole and a shaft inserted through the through-hole. The sealing device 1 is used for a reduction gear of an industrial machine, such as a robot, for example, and prevents leakage of lubricating oil as a sealing target within the reduction gear to the outside of the reduction gear and also prevents intrusion of a liquid and foreign matter, such as dust, into the reduction gear from the outside. Specifically, the sealing device 1 is used to, in a reduction gear of a robot, seal a gap between a through-hole formed in a housing and an output shaft rotatably inserted through the through-hole as described below. A target to which the sealing device 1 is applied is not limited to such a specific example, and thus, the sealing device 1 can be used for sealing a gap between a shaft that undergoes reciprocating motion and a through-hole in a variety of machines.

Hereinafter, for convenience's sake of description, the direction of an arrow a (see FIG. 1) along the direction of the axis x shall be assumed as the interior side, and the direction of an arrow b (see FIG. 1) along the direction of the axis x shall be assumed as the exterior side. The interior side is a side facing a sealing target, and thus is the sealing target side. The exterior side is a side opposite to the sealing target side and thus is the atmosphere side. It should be noted that regarding the direction perpendicular to the axis x (hereinafter also referred to as a "radial direction"), a direction away from the axis x (i.e., the direction of an arrow c in FIG. 1) is the outer periphery side, while a direction toward the axis x (i.e., the direction of an arrow d in FIG. 1) is the inner periphery side.

The sealing device 1 includes an annular reinforcement ring 10 around the axis x and also includes an elastic portion 20 around the axis x that is formed of an annular elastic material and attached to the reinforcement ring 10. The elastic portion 20 includes an annular seal lip 30. The seal lip 30 includes a lip tip end portion 31 and an interior side dust lip 32. The lip tip end portion 31 is an annular portion that is formed to contact the output shaft of the reduction gear as a target of application and that protrudes to the inner periphery side in the usage state of the sealing device 1 described below. The interior side dust lip 32 is an annular protrusion provided closer to the sealing target side (i.e., the interior side) than is the lip tip end portion 31 in the direction of the axis x. The interior side dust lip 32 protrudes toward the axis x, and is formed to contact the output shaft in the usage state of the sealing device 1 described below. The seal lip 30 also includes a dent portion 33 that forms a dent on the outer periphery side of a base 34 of the interior side dust lip 32. Hereinafter, the structure of the sealing device 1 will be specifically described.

The reinforcement ring 10 is an annular metal member having the axis x as the center or the approximate center as illustrated in FIG. 1, and has an L-shaped or approximately L-shaped cross-section along the axis x (hereinafter also simply referred to as a "cross-section"). The reinforcement ring 10 includes a cylindrical portion 11 that is a cylindrical or approximately cylindrical portion extending in the direction of the axis x, and a disk portion 12 that is a hollow disk-like portion extending from an end portion of the cylindrical portion 11 on the exterior side to the inner periphery side, for example. The cylindrical portion 11 is formed to allow the sealing device 1 to be fitted to the inner peripheral surface of the through-hole formed in the housing of the reduction gear as described below. The cylindrical portion 11 may be fittable to the inner peripheral surface of the through-hole by directly contacting it, or be fittable to the inner peripheral surface of the through-hole by contacting it via the elastic portion 20.

The elastic portion 20 is attached to the reinforcement ring 10 as illustrated in FIG. 1, and is formed integrally with the reinforcement ring 10 so as to cover the entire reinforcement ring 10 in the present embodiment. The elastic portion 20 includes the seal lip 30 as described above, and also includes an exterior side dust lip 21 that is an annular lip provided on the exterior side of the seal lip 30 and extending toward the axis x. In addition, the elastic portion 20 also includes an annular base portion 22. The base portion 22 is a portion of the elastic portion 20 located close to an end portion of the disk portion 12 of the reinforcement ring 10 on the inner periphery side.

The seal lip 30 is specifically a portion extending from the base portion 22 to the interior side as illustrated in FIG. 1, and is an annular portion having the axis x as the center or the approximate center. The seal lip 30 is formed facing the cylindrical portion 11 of the reinforcement ring 10. The seal lip 30 includes the annular lip tip end portion 31 as described above. The lip tip end portion 31 is formed at an inner end portion 30a that is an end portion of the seal lip 30 on the interior side, and has a cross-section in a wedge shape protruding to the inner periphery side. A garter spring 23 is fitted to the outer periphery side of the seal lip 30 at a position opposite to the lip tip end portion 31. The garter spring 23 provides a tightening force with a predetermined magnitude to the lip tip end portion 31 with respect to the output shaft so as to press the lip tip end portion 31 toward the axis x and thus allow the lip tip end portion 31 to follow the displacement of the output shaft. The lip tip end portion 31 contacts the outer peripheral surface of the output shaft as described below so as to seal a gap between the sealing device 1 and the output shaft.

Figure 2:
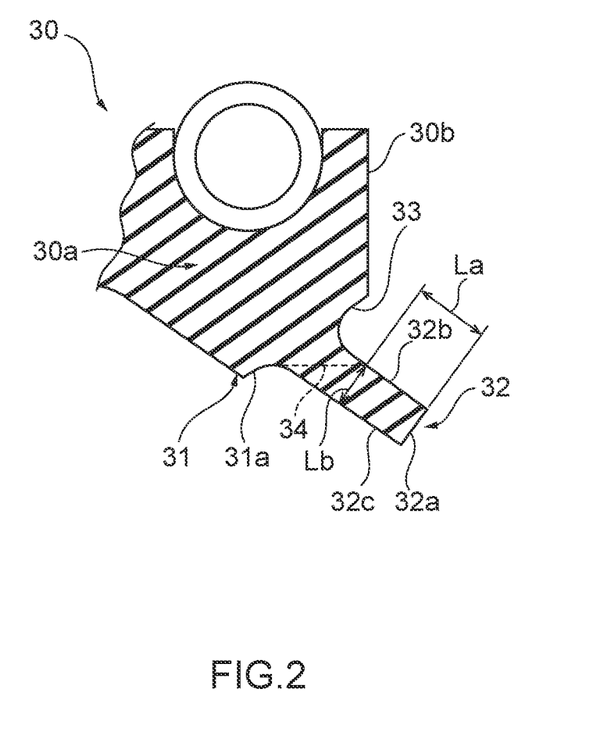
FIG. 2 is a partially enlarged cross-sectional view of the sealing device illustrated in FIG. 1, which illustrates an enlarged interior side dust lip and dent portion in the sealing device.

The interior side dust lip 32 specifically protrudes from a portion on the interior side of the lip tip end portion 31 at the inner end portion 30a of the seal lip 30 as illustrated in FIGS. 1 and 2, and is connected to a surface on the interior side (i.e., an interior side surface 31a) of the lip tip end portion 31. The interior side dust lip 32 is a lip-like portion and has a conical tubular shape or an approximately conical tubular shape having the axis x as the center or the approximate center. The interior side dust lip 32 is formed such that its tip end 32a contacts the output shaft in the usage state. The contact width (i.e., interference) of the portion where the interior side dust lip 32 contacts the output shaft in the direction of the axis x is greater than the interference of the lip tip end portion 31, and the interior side dust lip 32 is formed to have a predetermined aspect ratio, for example. The aspect ratio is the ratio of the length of the interior side dust lip 32 along its extension direction to the width of the interior side dust lip 32 in the direction orthogonal to the extension direction. Specifically, as illustrated in FIG. 2, the aspect ratio is the ratio (La/Lb) of the length La of an outer periphery side surface 32b to the width Lb of the interior side dust lip 32 at the base 34 along a cross-section of the interior side dust lip 32. The aspect ratio of the interior side dust lip 32 is less than 2, for example. It should be noted that the width Lb is the length of a line segment of a line, which is orthogonal to a line depicted by the outer periphery side surface 32b of the interior side dust lip 32, at the base 34 between the line depicted by the outer periphery side surface 32b of the interior side dust lip 32 and a line depicted by an inner periphery side surface 32c of the interior side dust lip 32 or an extended line of the line depicted by the inner periphery side surface 32c. The outer periphery side surface 32b of the interior side dust lip 32 is a surface that spreads on the outer periphery side with respect to the tip end 32a of the interior side dust lip 32, while the inner periphery side surface 32c of the interior side dust lip 32 is a surface that spreads on the inner periphery side with respect to the tip end 32a of the interior side dust lip 32. In addition, the base 34 is a portion where the inner end portion 30a and the interior side dust lip 32 of the seal lip 30 are connected, and is a portion continuous with the interior side surface 31a of the lip tip end portion 31 and an end of the dent portion 33 on the inner periphery side. The aspect ratio of the interior side dust lip 32 is not limited to less than 2.

Figure 3:
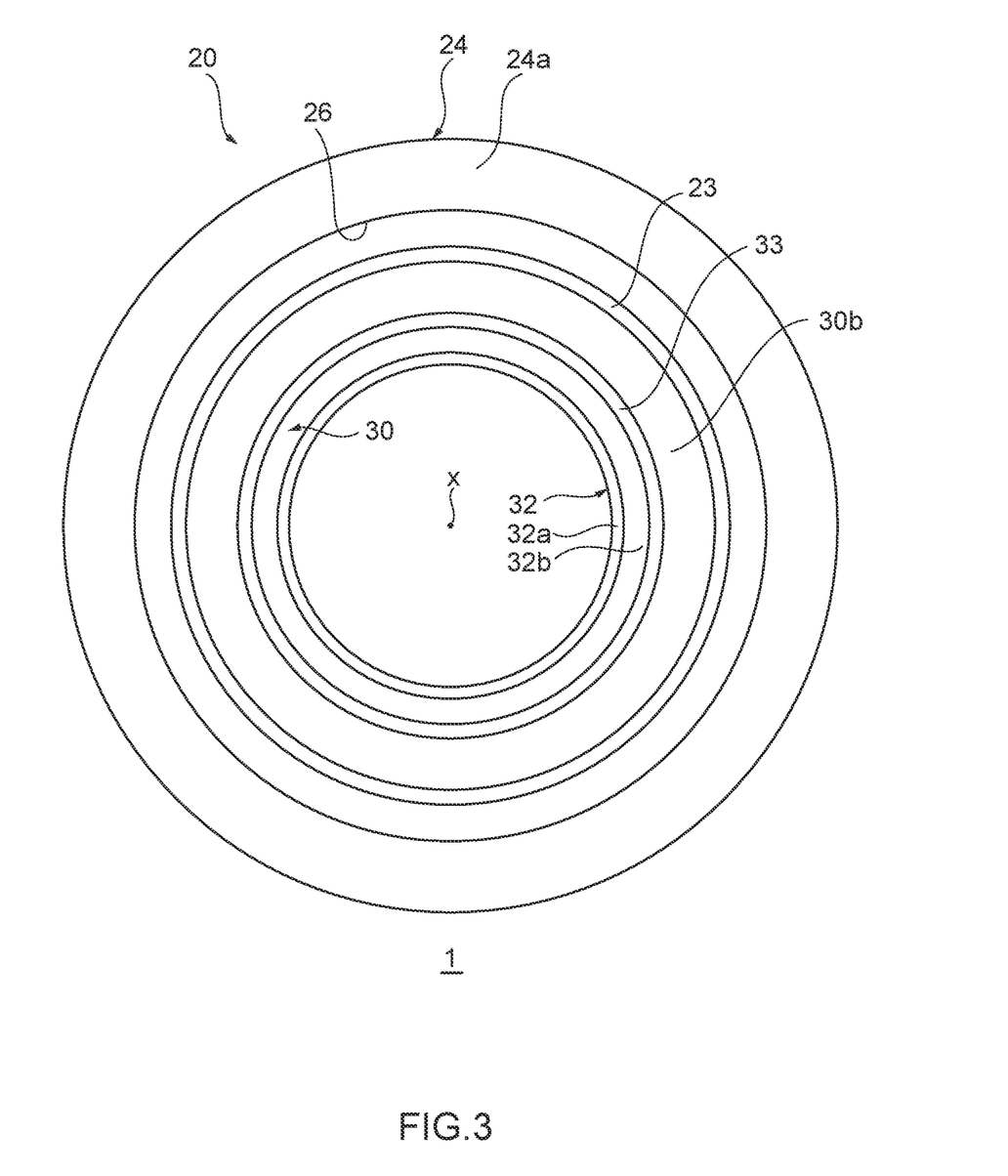
FIG. 3 is a front view of the sealing device illustrated in FIG. 1 as seen from the interior side along the axis.

The dent portion 33 specifically extends in an endless annular shape around the base 34 of the interior side dust lip 32 as illustrated in FIGS. 2 and 3. In addition, the dent portion 33 is provided adjacent to the base 34 on the outer periphery side thereof that defines an interior side end surface 30b that is a linear surface, and is connected to the outer periphery side surface 32b of the interior side dust lip 32. The dent portion 33 extends radially inward from the interior side end surface 30b (linear surface) and, it is preferable that the dent portion 33 be smoothly connected to the outer periphery side surface 32b of the interior side dust lip 32. The dent portion 33 forms a portion, which dents to the side (i.e., exterior side) opposite to the sealing target side, on the interior side end surface 30b that is a surface facing the interior side at an end of the seal lip 30 on the sealing target side (i.e., the interior side). That is, the dent portion 33 forms an annular dent, which dents to the exterior side, in a portion where the interior side end surface 30b spreads in the conventional sealing device. With such a dent portion 33, it is possible to reduce a force of lifting the lip tip end portion 31 generated due to the deformation of the interior side dust lip 32 in the usage state as described below.

The cross-sectional shape of the dent portion 33 is arcuate, for example. The cross-sectional shape of the dent portion 33 is not limited to arcuate, and may be a V-shape, a rectangular shape, a curved shape, a linear shape, or a combination thereof as long as such a shape can achieve the function described below.

The exterior side dust lip 21 is a lip-like portion and has a conical tubular shape or an approximately conical tubular shape having the axis x as the center. The exterior side dust lip 21 is formed such that a tip end of the exterior side dust lip 21 contacts the output shaft in the usage state. The exterior side dust lip 21 extends from the base portion 22 to the exterior side and toward the axis x. Specifically, as illustrated in FIG. 1, the exterior side dust lip 21 extends from the base portion 22 to the exterior side and to the inner periphery side. The exterior side dust lip 21 prevents intrusion of a liquid and foreign matter, such as dust, from the exterior side toward the lip tip end portion 31. In the usage state, the exterior side dust lip 21 may be located close to the output shaft without contacting the output shaft.

The elastic portion 20 includes a gasket portion 24, a rear cover portion 25, and a lining portion 26.

The gasket portion 24 is a portion of the elastic portion 20 covering the cylindrical portion 11 of the reinforcement ring 10 from the outer periphery side. The radial thickness of the gasket portion 24 is set so that when the sealing device 1 is press-fitted into the through-hole, which is adapted to pass the output shaft, in the reduction gear, the gasket portion 24 is radially compressed between the through-hole and the cylindrical portion 11 of the reinforcement ring 10, and a fitting force, which is a radially acting force, with a predetermined magnitude is generated as described below. The rear cover portion 25 is a portion covering the disk portion 12 of the reinforcement ring 10 from the exterior side, and the lining portion 26 is a portion covering the reinforcement ring 10 from the interior side and the inner periphery side.

It should be noted that the elastic portion 20 is integrally formed from an elastic material. Thus, each of the seal lip 30, the exterior side dust lip 21, the base portion 22, the gasket portion 24, the rear cover portion 25, and the lining portion 26 is a portion of the elastic portion 20 integrally formed from an elastic material.

Examples of metal materials of the reinforcement ring 10 include stainless steel and SPCC (cold rolled steel sheet). Examples of elastic materials of the elastic portion 20 include a variety of rubber materials. Examples of a variety of rubber materials include synthetic rubber, such as nitrile rubber (NBR), hydrogenated nitrile rubber (H-NBR), acrylic rubber (ACM), and fluorocarbon rubber (FKM). The reinforcement ring 10 is produced through press work or forging, for example, and the elastic portion 20 is molded through cross-linking (or vulcanization) molding using a mold. During such cross-linking molding, the reinforcement ring 10 is disposed in the mold, and the elastic portion 20 is bonded to the reinforcement ring 10 through cross-linking bonding so that the elastic portion 20 is integrally molded with the reinforcement ring 10.

Figure 4:
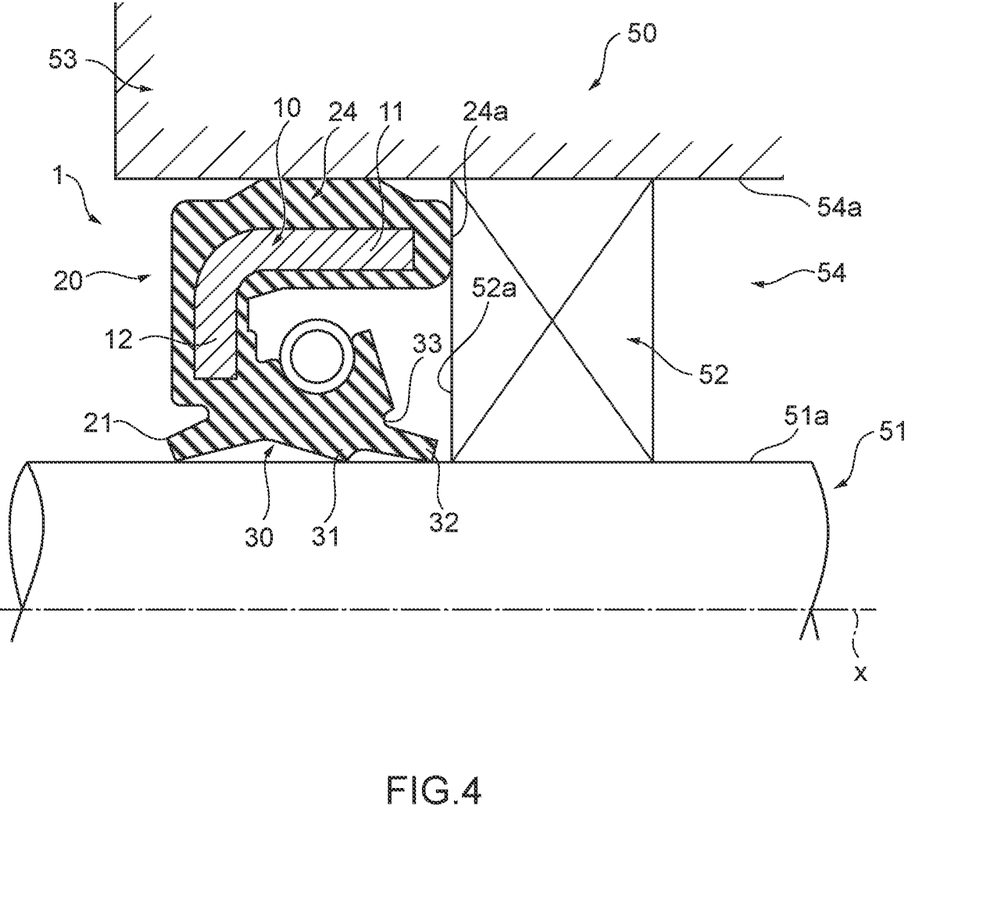
FIG. 4 is a view for illustrating the sealing device in the usage state while being attached to a reduction gear of a robot as an example of application, which is a partially enlarged cross-sectional view of the reduction gear in a region around the sealing device along the axis.

Next, the function of the sealing device 1 with the aforementioned configuration will be described. FIG. 4 is a view for illustrating the sealing device 1 in the usage state while being attached to a reduction gear 50 of a robot as an example of application, and is a partially enlarged cross-sectional view of the reduction gear 50 in a region around the sealing device 1 along the axis x.

The reduction gear 50 is a known reduction gear, and thus, the detailed description of its configuration is omitted herein. As illustrated in FIG. 4, in the reduction gear 50, the sealing device 1 is attached in contact with a bearing 52, which rotatably supports an output shaft 51, along the direction of the axis x. The attachment configuration of the sealing device 1 in the reduction gear 50 is not limited to this.

The sealing device 1 is fitted into a through-hole 54 formed in a housing 53 of the reduction gear 50 as illustrated in FIG. 4. The output shaft 51 is rotatably supported by the bearing 52 fixed to the housing, and the output shaft 51 is inserted through the through-hole 54 with an annular gap formed therebetween.

In the through-hole 54 of the housing 53, a gap between an outer peripheral surface 51a of the output shaft 51 and an inner peripheral surface 54a of the through-hole 54 is sealed by the sealing device 1. Specifically, when the sealing device 1 is fitted into the through-hole 54, the gasket portion 24 of the elastic portion 20 is compressed between the cylindrical portion 11 of the reinforcement ring 10 and the inner peripheral surface 54a of the through-hole 54 so that the gasket portion 24 is tightly attached to the inner peripheral surface 54a of the through-hole 54, and a gap between the sealing device 1 and the through-hole 54 on the outer periphery side is sealed. In addition, the lip tip end portion 31 of the seal lip 30 of the elastic portion 20 contacts the outer peripheral surface 51a of the output shaft 51 such that the output shaft 51 is slidable, and a gap between the sealing device 1 and the output shaft 51 on the inner periphery side is sealed. This prevents leakage of lubricating oil within the housing 53 to the outside. In addition, the tip end edge of the exterior side dust lip 21 contacts the outer peripheral surface 51a of the output shaft 51 such that the output shaft 51 is slidable, and thus prevents intrusion of foreign matter into the interior side from the outside (i.e., the atmosphere side) of the housing 53. The exterior side dust lip 21 need not contact the output shaft 51.

In addition, the tip end 32a of the interior side dust lip 32 contacts the outer peripheral surface 51a of the output shaft 51 such that the output shaft 51 is slidable, and thus prevents the approach of foreign matter within the housing 53 to the lip tip end portion 31. The reduction gear 50 of the robot includes a number of power transmission members, such as gears, that contact each other within the housing 53. Therefore, due to friction between the power transmission members that contact each other, foreign matter, such as wear debris, is produced. When foreign matter mixed with lubricating oil approaches the lip tip end portion 31 either alone or together with the lubricating oil, the foreign matter may become trapped between the lip tip end portion 31 and the output shaft 51. When the foreign matter is caught by the lip tip end portion 31, the lip tip end portion 31 may become damaged, and thus, the sealing performance of the seal lip 30 may degrade. In the disclosure of the present application, the interior side dust lip 32 prevents intrusion of foreign matter within the housing toward the lip tip end portion 31 on the interior side of the lip tip end portion 31, thereby preventing the foreign matter from being trapped between the lip tip end portion 31 and the output shaft 51. This can suppress damage to the lip tip end portion 31 due to the foreign matter within the housing 53 and thus can suppress a decrease in the seal performance of the seal lip 30.

In the usage state, the interior side dust lip 32 deforms upon contact with the output shaft 51 such that the interior side dust lip 32 falls to the outer periphery side with the base 34 as the center as seen in cross-section or such that the interior side dust lip 32 bends to the outer periphery side in a region from the base 34 as seen in cross-section. Due to such deformation, the seal lip 30 has generated therein a force of lifting the lip tip end portion 31 to the outer periphery side, which in turn decreases the tightening force between the lip tip end portion 31 and the output shaft 51. Therefore, for example, when the aspect ratio La/Lb of the interior side dust lip 32 (see FIG. 2) is set small and the rigidity of the interior side dust lip 32 is thus increased, it is considered that the interior side dust lip 32 becomes less likely to deform in the usage state, with the result that the force of lifting the lip tip end portion 31 to the outer periphery side, which is generated in the seal lip 30, is increased. In a sealing device without the dent portion 33, when the aspect ratio of the interior side dust lip 32 is less than 2, for example, it is considered that the lip tip end portion 31 is lifted to the outer periphery side due to the force of lifting the lip tip end portion 31 to the outer periphery side, which is generated in the seal lip 30.

However, since the sealing device 1 has the dent portion 33 formed on the outer periphery side of the base 34 of the interior side dust lip 32, the interior side dust lip 32 can easily move while tilting to the outer periphery side with the base 34 as the center. Therefore, even when the rigidity of the interior side dust lip 32 is high and the force of lifting the lip tip end portion 31 to the outer periphery side, which is generated in the seal lip 30, is increased due to the interior side dust lip 32 in the usage state, such a force is absorbed by the dent portion 33. Thus, an increase in the force of lifting the lip tip end portion 31 to the outer periphery side in the seal lip 30 can be suppressed.

As described above, in the usage state, the sealing device 1 is attached such that an end on the interior side (i.e., an interior side end 24a) of the gasket portion 24 contacts an exterior side surface 52a of the bearing 52. The shape of each portion of the sealing device 1 is set so that the interior side dust lip 32 does not contact the bearing 52 in the usage state. For example, the dimension of the cylindrical portion 11 of the reinforcement ring 10 or the gasket portion 24 of the elastic portion 20 in the direction of the axis x, the dimension of the seal lip 30 in the direction of the axis x, the length of the interior side dust lip 32, the tilt angle of the interior side dust lip 32 with respect to the axis x, and the like are set so that the interior side dust lip 32 does not contact the bearing 52.

To reduce the width of the sealing device 1 in the direction of the axis x and thus reduce the attachment width of the sealing device 1 in the housing 53, it is preferable to set the length La of the interior side dust lip 32 short. This is because the influence on the length of the seal lip 30 can be reduced, and the influence on the fastening force of the lip tip end portion 31 with respect to the output shaft 51 can also be reduced. When the length La of the interior side dust lip 32 is set short, the rigidity of the interior side dust lip 32 is increased as described above. However, since the dent portion 33 absorbs the force of lifting the lip tip end portion 31 to the outer periphery side, an increase in the force of lifting the lip tip end portion 31 to the outer periphery side can be suppressed. Therefore, even when the length La of the interior side dust lip 32 is set short and the rigidity of the interior side dust lip 32 is thus increased, it is possible to suppress a phenomenon that the lip tip end portion 31 is lifted from the output shaft 51, which would decrease the tightening force of the lip tip end portion 31 with respect to the output shaft 51.

As described above, with the sealing device 1 according to an embodiment of the present disclosure, it is possible to suppress a decrease in the tightening force of the seal lip 30 with respect to the output shaft 51 regardless of the rigidity of the interior side dust lip 32, and thus suppress a decrease in the seal performance of the sealing device 1 regardless of the rigidity of the interior side dust lip 32.

In addition, in the sealing device 1, the length La of the interior side dust lip 32 can be set short and the width of the sealing device 1 in the direction of the axis x can be reduced, and thus, the attachment space of the sealing device 1 in the housing 53 can be reduced without a decrease in the seal performance of the sealing device 1.

Further, since the length La of the interior side dust lip 32 can be set short without a decrease in the seal performance of the sealing device 1, it is possible to maintain the length of the seal lip 30 in the direction of the axis x at a desired length or a length close to the desired length. In this point also, a decrease in the seal performance of the sealing device 1 can be suppressed.

Figure 5:
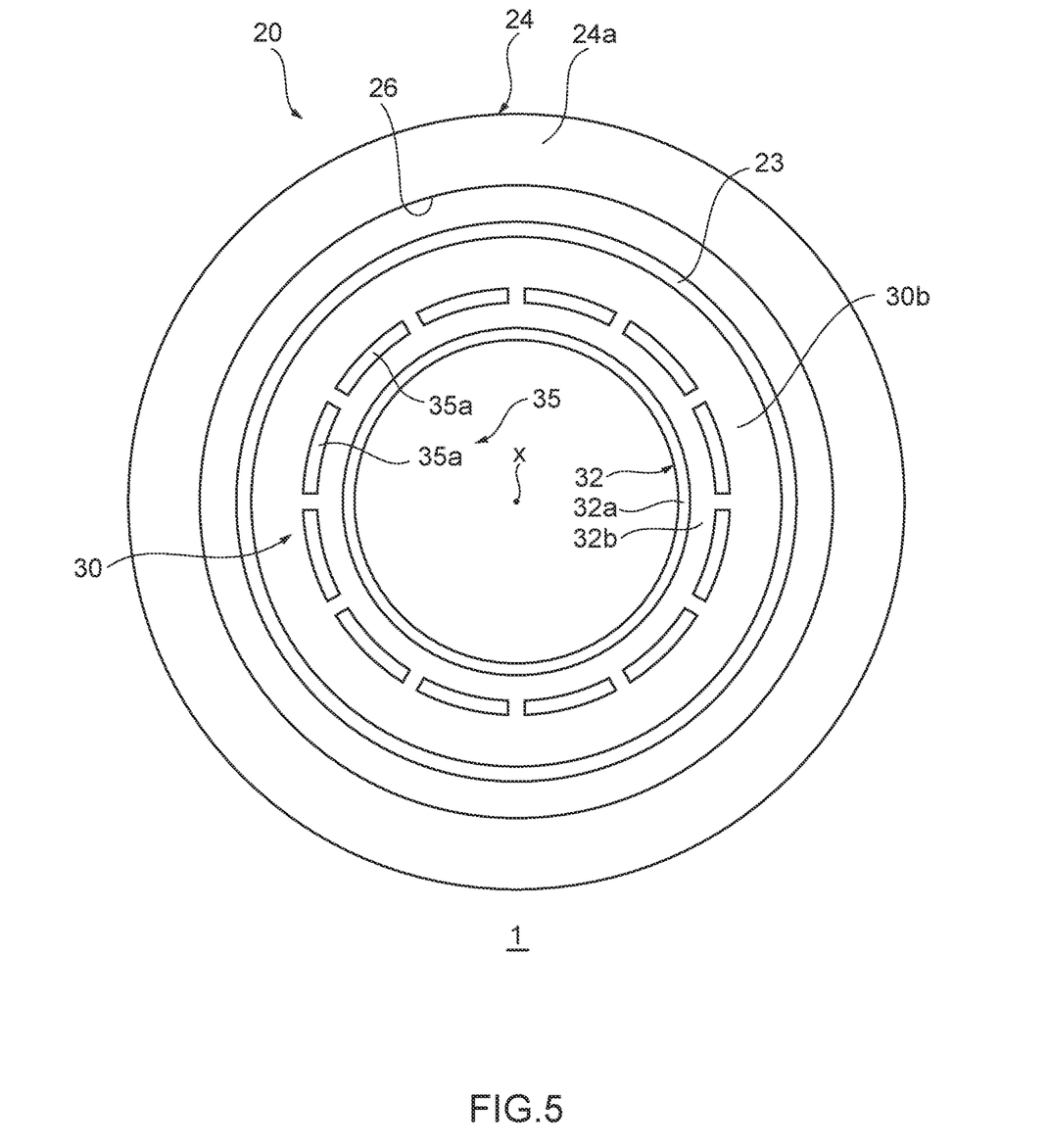
FIG. 5 is a view illustrating a dent portion according to a modified example, which is a front view of the sealing device as seen from the interior side along the axis.

Next, a modified example of the dent portion 33 in the aforementioned sealing device 1 will be described. FIG. 5 is a view illustrating a dent portion 35 according to a modified example, which is a front view of the sealing device 1 as seen from the interior side along the axis x. The dent portion 35 according to the modified example extends in an intermittent annular shape around the axis x unlike with the dent portion 33. Specifically, the dent portion 35 is formed by arranging a plurality of intermittent dent portions 35a each forming an arc-like, approximately arc-like, or approximately annular dent along a circle having the axis x as the center or the approximate center. Two or more intermittent dent portions 35*a* forming the dent portion 35 are arranged at equiangular intervals around the axis x. It should be noted that the intermittent dent portions 35*a* need not be arranged at equiangular intervals around the axis x. Alternatively, the dent portion 35 may include only one intermittent dent portion 35*a* that is approximately annular in shape. That is, the dent portion 35 may have a configuration such that the aforementioned dent portion 33 is partially cut and thus the dent portion 35 may be approximately annular in shape but not endless. The cross-sectional shape of the intermittent dent portion 35*a* is similar to the cross-sectional shape of the dent portion 33.

Although an embodiment of the present disclosure has been described above, the present disclosure is not limited to the sealing device 1 according to the aforementioned embodiment of the present disclosure, and includes all aspects encompassed by the concept and the claims of the present disclosure. In addition, the aforementioned configurations may be selectively combined as appropriate so as to achieve at least some of the aforementioned object and effects. For example, the shape, material, arrangement, size, and the like of each component in the aforementioned embodiment may be changed as appropriate depending on a specific usage pattern of the present disclosure.

For example, although the dent portion 33 or 35 in the aforementioned sealing device 1 is continuous with the outer periphery side surface 32*b* of the interior side dust lip 32, the dent portion 33 or 35 need not be connected to the outer periphery side surface 32*b* of the interior side dust lip 32. That is, the dent portion 33 or 35 may be provided on the interior side end surface 30*b* of the seal lip 30 at a position away from the outer periphery side surface 32*b* of the interior side dust lip 32 with an annular gap therebetween.

Although a specific target to which the sealing device 1 according to an embodiment of the present disclosure is applicable has been exemplarily described above, the target to which the present disclosure is applicable is not limited thereto, and the present disclosure is applicable to any configuration that can utilize the effects achieved by the present disclosure, such as other industrial machines, general-purpose machines, and vehicles.

The invention claimed is:

1. A sealing device for sealing a gap between a through-hole and a shaft inserted through the through-hole, comprising:

an annular reinforcement ring around an axis; and
an elastic portion around the axis, the elastic portion being formed of an annular elastic material and being attached to the reinforcement ring,
wherein:
the elastic portion includes an annular seal lip having an outer periphery side and an inner periphery side,
a garter spring is fitted to the outer periphery side of the seal lip;
the seal lip includes an annular lip tip end portion protruding to the inner periphery side and formed to contact the shaft, and an interior side dust lip that is an annular protrusion provided closer to a sealing target side than is the lip tip end portion in a direction of the axis,
the interior side dust lip protrudes toward the axis and is formed to contact the shaft,
the seal lip includes a dent portion on an outer periphery side of a base of the interior side dust lip, the dent portion forming a dent,
the outer periphery side of the elastic portion extends away from the garter spring and is connected to the outer periphery side of the base of the interior side dust lip, the outer periphery side of the base defining a linear surface and the dent extending axially inward from the linear surface, and
the dent portion extends in an intermittent annular shape around the axis.

2. The sealing device according to claim 1, wherein the dent portion forms, on an interior side end surface that is a surface of the seal lip facing the sealing target side, a portion that dents to a side opposite to the sealing target side.

3. The sealing device according to claim 1, wherein the dent portion is continuous with the interior side dust lip.

4. The sealing device according to claim 1, wherein an aspect ratio of the interior side dust lip is less than 2, the aspect ratio being a ratio of a length of the interior side dust lip along an extension direction of the interior side dust lip to a width of the interior side dust lip in a direction orthogonal to the extension direction.

5. The sealing device according to claim 1, wherein the dent portion has a cross-sectional shape that is selected from the group consisting of a V-shape, a rectangular shape, and a shape in which a curved portion is connected to a straight portion.

* * * * *